United States Patent
Long

[11] Patent Number: 6,149,179
[45] Date of Patent: Nov. 21, 2000

[54] WHEELIE STABILIZER AND SAFETY DEVICE

[76] Inventor: Thomas B. Long, 4627 170th Street North, Hugo, Minn. 55038

[21] Appl. No.: 09/346,767

[22] Filed: Jul. 1, 1999

[51] Int. Cl.$^7$ .................................................. B62H 1/00
[52] U.S. Cl. ............................ 280/293; 280/288.4
[58] Field of Search .......................... 280/288.4, 767, 280/755, 293, 295, 298, 205

[56] References Cited

U.S. PATENT DOCUMENTS

| | | |
|---|---|---|
| 616,386 | 12/1898 | Wisniewski . |
| 979,572 | 12/1910 | Sayer . |
| 1,227,635 | 5/1917 | Lake . |
| 1,478,428 | 12/1923 | Duncan . |
| 1,682,764 | 9/1928 | Mohr . |
| 2,280,327 | 4/1942 | Ware . |
| 2,629,611 | 2/1953 | Covington ............................ 280/293 |
| 3,023,027 | 2/1962 | Franciscus ........................... 280/293 |
| 3,284,096 | 11/1966 | Hansen et al. ........................ 280/293 |
| 3,427,037 | 2/1969 | Marasco . |
| 3,437,351 | 4/1969 | St. Clair Newbern ................ 280/205 |
| 3,653,679 | 4/1972 | Howard . |
| 3,888,511 | 6/1975 | Parrilla . |
| 3,961,810 | 6/1976 | Arico . |
| 3,997,185 | 12/1976 | Parrilla ................................ 280/293 |
| 4,012,054 | 3/1977 | Moore . |
| 4,153,268 | 5/1979 | Wilson et al. . |
| 4,154,452 | 5/1979 | Newman . |
| 4,230,046 | 10/1980 | Smart .................................. 280/293 X |
| 4,353,571 | 10/1982 | Anderson . |
| 4,367,883 | 1/1983 | Anderson . |
| 5,064,213 | 11/1991 | Storch ................................. 280/293 X |
| 5,242,183 | 9/1993 | Oberg et al. . |
| 5,330,221 | 7/1994 | Sutton . |
| 5,368,323 | 11/1994 | Young ................................. 280/293 |
| 5,419,575 | 5/1995 | Shepard ............................. 280/293 X |
| 5,765,871 | 6/1998 | Wyman et al. . |

FOREIGN PATENT DOCUMENTS

| | | |
|---|---|---|
| 1388939 | 12/1963 | France . |
| 52780 | 7/1942 | Netherlands . |
| 9009918 | 9/1990 | WIPO . |

*Primary Examiner*—Brian L. Johnson
*Assistant Examiner*—Bryan Fischmann
*Attorney, Agent, or Firm*—Walter K. Roloff; Robert A. Pajak

[57] ABSTRACT

A wheelie stabilizer and safety device includes in combination a mounting bracket, a pivotable arm assembly, a hinge device, a stabilizer wheel assembly, and a spring member. The mounting bracket is attached to a rear axle of a bicycle, with the pivotable arm assembly extending rearwardly therefrom and terminating in the hinge device. The stabilizer wheel assembly is, in turn, hingably coupled to the hinge device. The spring member is disposed between the mounting bracket and the pivotable arm to provide flexion of the arm when, in operation, ground contact is made with the stabilizer wheel assembly.

5 Claims, 8 Drawing Sheets

WHEELIE STABILIZER AND SAFETY DEVICE

FIELD OF THE INVENTION

The present invention relates generally to a safety device for stabilizing a rear wheel-stand maneuver on a bicycle commonly referred to as a wheelie, and for providing safety to a bicycle rider while performing the maneuver.

BACKGROUND OF THE INVENTION

Certain two-wheeled bicycles have grown in popularity in recent years. Among these bicycles or "bikes" are rugged off-road bicycles commonly referred to as "dirt bikes" or "motocross bikes" (or, "BMX bikes"). Collectively, these BMX-type bikes are subject to thrilling maneuvering by their riders, including jumps and limited aerobatics. Often while operating or riding such a bike, a rider desires to lift the bike's front wheel off of a ground plane upon which the bike is traveling on its two wheels, in performance of a maneuver known as a "wheelie". Performing a wheelie (or "popping a wheelie") with a BMX-type bike (or, for that matter, any bicycle) usually involves the rider rotating the bike's frame upward and backward about the bike's rear wheel axle, while balancing on the bike's rear wheel as the bike maintains linear motion along the ground. In this manner, the front wheel leaves the ground to maintain a somewhat constant vertical displacement thereabove, and the bike essentially performs like a unicycle during the wheelie maneuver until the rider returns the front wheel to the ground at the end of the wheelie maneuver. "Wheelies" really have no inherent practical value in safe and efficient operation of a bicycle; however, aggressive riders typically desire to perform them in a display of coordination and bicycle mastery to their peers. Further, riders also enjoy performing certain stunts while popping wheelies such as spinning or twisting the vertically displaced front wheel (again, in a display of coordination and balance).

As may be appreciated by anyone familiar with bicycles, popping a wheelie introduces stability problems. That is, in a wheelie, bicycle stability is generally reduced since the bicycle front wheel is lifted off of ground contact. Balance and "seat of the pants" center of gravity manipulation by the rider become of great importance to maintain the wheelie. Further, in popping a wheelie there exists a modicum of danger to the rider. In particular, a rider's physical safety is compromised when the bike frame is rotated too far upward and backward about the bike's rear wheel axle. In such an over-rotated position, the rider's mass will tend to continue backward past the bike's center of gravity established during the wheelie maneuver and be unrecoverable from this center of gravity departure, resulting then in a painful collision with the ground.

Numerous attempts have been made to stabilize a bike while popping a wheelie and to provide a margin of safety such that the rider does not over-rotate the bike as afore-described. Nearly all of these attempts utilize a structure extending rearwardly from the bike having at least one ground contact member that prevents the bike from over-rotating during a wheelie.

For example, U.S. Pat. No. 3,653,679 issued to Howard, entitled Bicycle Attachment and Combination, discloses a bicycle attachment including a frame that is attached at one end to a rear portion of a bicycle. A wheel or pair of wheels is attached to the frame's outboard end. The attachment acts to limit angular movement between the bicycle and the attachment when the bicycle's front wheel is raised.

In U.S. Pat. No. 3,888,511 issued to Parrilla, entitled Safety Device to Prevent Tipping a Bicycle, a bicycle is prevented from backwardly tipping over when the bicycle's front wheel is raised by use of a frame having two linear rigid horizontal frame members.

In U.S. Pat. No. 3,961,810 issued to Arico, entitled Bicycle Safety and Conversion Wheel, the disclosed device incorporates a structure having a pair of frame members extending outwardly from a rear portion of a bicycle. The structure includes what essentially resembles a rear portion of a typical skateboard. Upon popping a wheelie the structure contacts the ground for stability. Further, a bicyclist performing the wheelie may ride on the skateboard-like portion of the structure itself during the wheelie.

U.S. Pat. No. 4,153,268 issued to Wilson et al. and entitled Cycle Stabilizing Accessory discloses a pair of adjustable length members that serve as an attachment frame to carry a pair of outboard stabilizing wheels.

In U.S. Pat. No. 4,154,452 issued to Newman, entitled Bicycle Safety Accessory, a spaced pair of generally parallel support arms extends rearwardly from each side of a bicycle rear wheel. A ground contact member or accessory wheel is secured to a rearward end of the paired support arms.

U.S. Pat. No. 4,353,571 issued to Anderson and entitled Wheelie Support discloses a device that enables a rider to perform a wheelie by resting on an outboard wheelie support attached to a bicycle's rear wheel fender.

In U.S. Pat. No. 4,367,883 issued to Anderson, entitled Wheelie Support, a device is disclosed that provides contact, during a wheelie, on the rear bicycle wheel and on a wheelie support. The wheelie support extends forward of the rear wheel, and is displaced above ground level. Ground contact of the wheelie support is made when popping a wheelie.

U.S. Pat. No. 5,242,183 issued to Oberg et al. and entitled Bicycle Accessory for Stabilization while Popping Wheelies provides an accessory including a pair of frame members, and also a substantially U-shaped fifth frame member, attached to a bicycle.

In U.S. Pat. No. 5,330,221 issued to Sutton and entitled Bicycle Wheelie Balancing Device a device is attached to a bicycle to aid a rider in learning to "pop a wheelie." The device includes a support frame attached to the bicycle, with an opposite end of the frame attached to a tandem wheel assembly resembling a portion of a skateboard similar to that illustrated in the aforedescribed U.S. Pat. No. Arico '810.

These above patents, however, do not adequately address, for instance, related problems introduced by the various stabilizing devices themselves. Specifically, in operation, such devices tend to skid along the ground because of their rigid bicycle attachment, thereby degrading and shortening the useful lives of their ground contact members. Also, in operation when the devices contact the ground, lateral forces are often imparted to the bicycle frames such that the bicycles become unstable in a left-to-right-to-left sense during a wheelie. Additionally, such devices may actually prevent performance of a wheelie because of ground contact occurring too soon after initiation of the wheelie maneuver.

Therefore, there exists a need for a wheelie stabilizer and safety device that aids the rider in performance of the wheelie by stabilizing the maneuver, and that also provides protection against over-rotation during the maneuver. A need exists for these functions to be provided without skidding a ground contact stabilizer member, nor imparting unwanted lateral forces to the bicycle frame, and without hindering desired wheelie performance.

SUMMARY OF THE INVENTION

An object of the invention is to provide a wheelie stabilizer and safety device that assists a bicycle rider in performing a wheelie maneuver.

Another object of the invention is to provide a wheelie stabilizer and safety device that provides safety to a bicycle rider in performing a wheelie maneuver.

In accordance with the present invention, a bicycle attachment for providing stability and safety to a rider during performance of a wheelie by the rider on the bicycle includes a mounting bracket that attaches to a bicycle frame near the bicycle's rear axle. An arm is pivotally connected to the mounting bracket, and extends rearwardly therefrom. A stabilizer wheel is attached to a rearward end of the arm by means of a hinge. The hinge provides articulation of the stabilizer wheel in a left-to-right-to-left sense with respect to a ground plane upon which the bicycle is operating. Interposed between the arm and the bracket is a spring, that allows flexion pivoting of the arm and stabilizer wheel combination with respect to the bracket. A foot rest peg may further be coupled to the stabilizer wheel, to provide a foot rest and forcible left-to-right-to-left articulation of the stabilizer wheel.

DETAILED DESCRIPTION OF THE INVENTION

Figure 1:
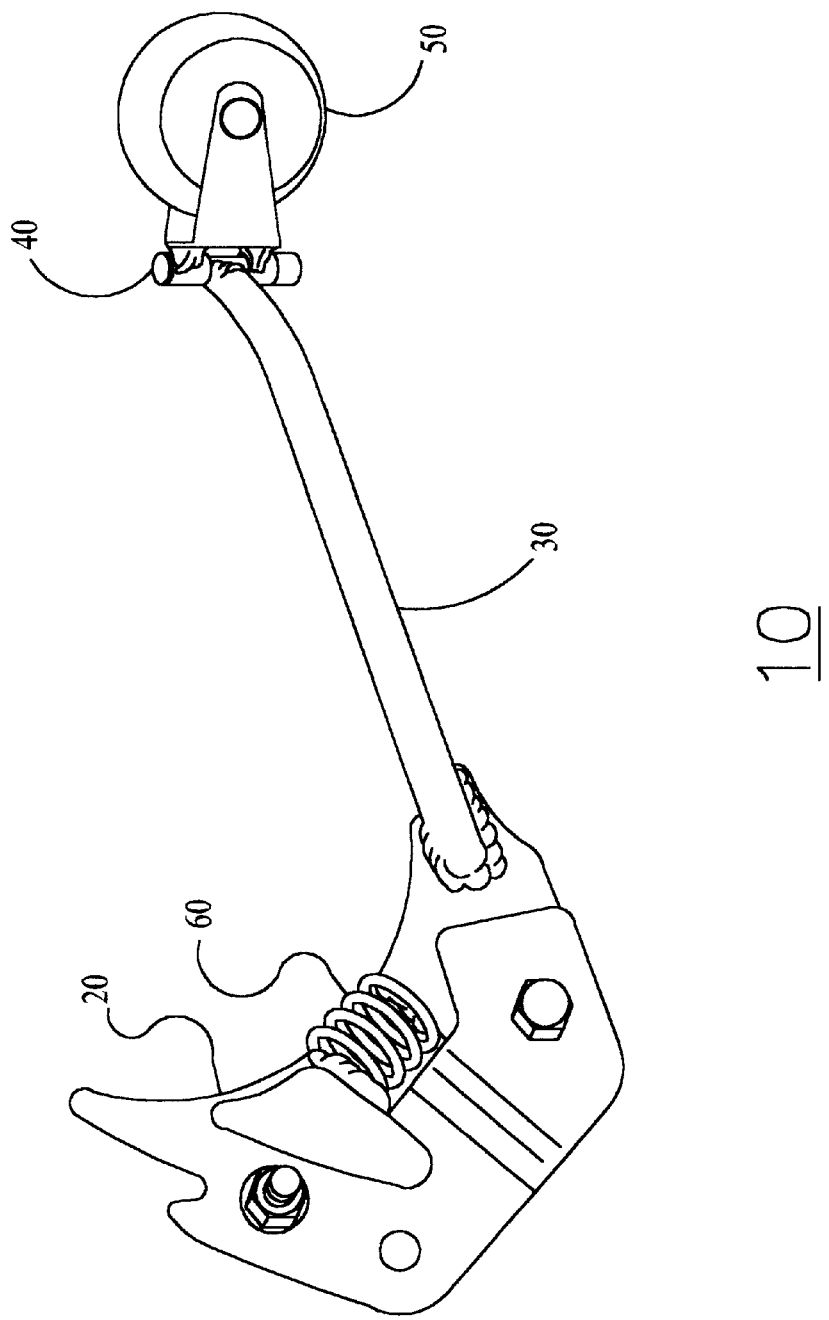
FIG. 1 is a perspective illustration of a wheelie stabilizer and safety device of the present invention.
Figure 2:
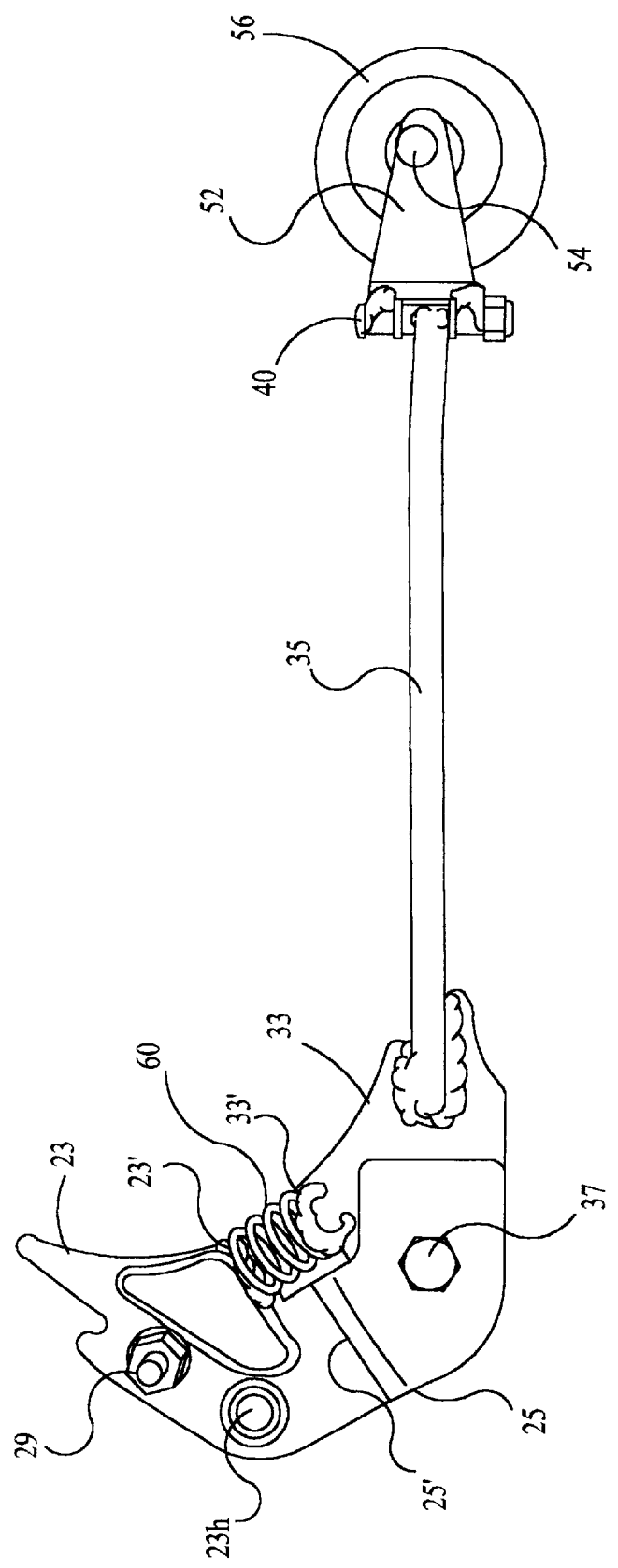
FIG. 2 is a front side illustration of a wheelie stabilizer and safety device of the present invention.
Figure 3:
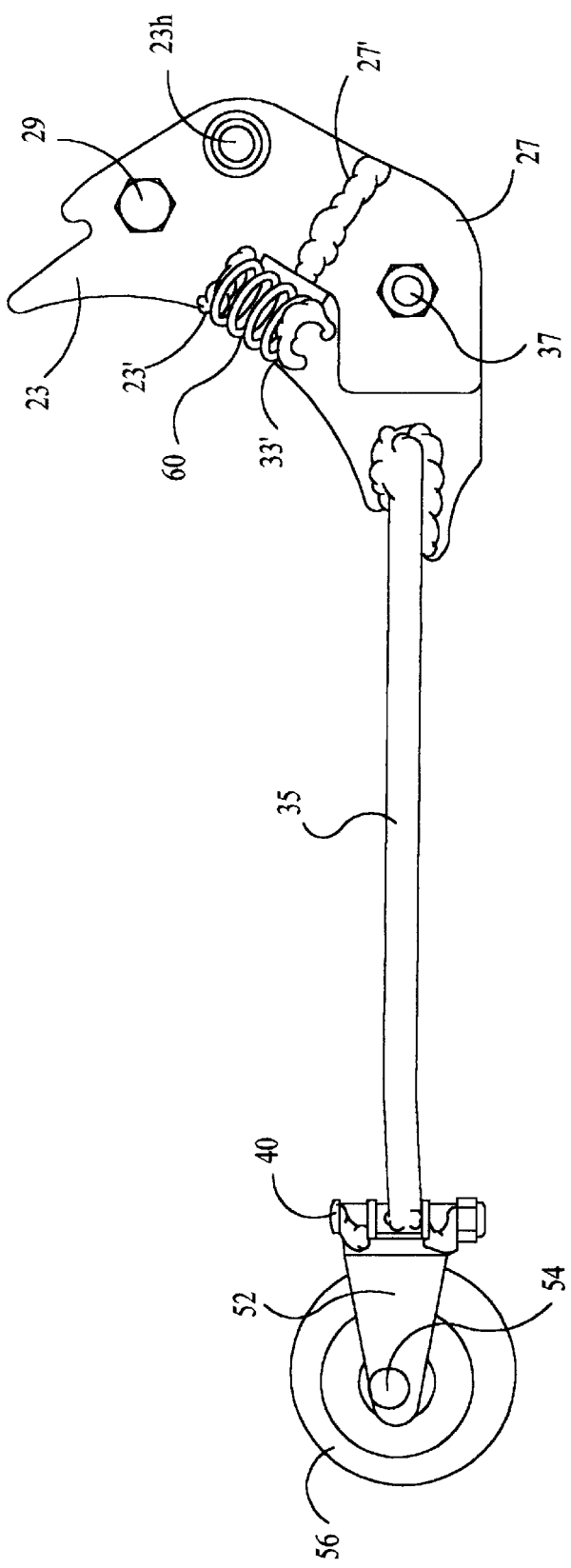
FIG. 3 is a back side illustration of a wheelie stabilizer and safety device of the present invention.

Referring generally to FIGS. 1, 2, and 3, thereshown are various illustrations of a wheelie stabilizer and safety device of the present invention.

Throughout this exposition, the word "bicycle" as used herein is intended to refer to and include any wheeled conveyance resembling, in appearance or function, a bicycle such as, for example, a motocross bicycle (or "BMX bike"), a selectable gear bicycle or "racing" bicycle, a "mountain" bicycle, or even an engine-powered cycle or motorcycle.

Illustrated in FIG. 1 is a wheelie stabilizer and safety device 10 (hereinafter, "stabilizer 10") of the present invention. Stabilizer 10 includes a mounting bracket 20, a pivotable arm assembly 30, a hinge means 40, a stabilizer wheel assembly 50, and a spring member 60.

With particular reference to FIGS. 2 and 3, mounting bracket 20 includes a mounting plate member 23, and opposing spaced-apart bracket members 25 and 27. Bracket members 25 and 27 are rigidly attached to opposite sides, respectively, of mounting plate member 23 so as to form a slot between bracket members 25 and 27 for insertion of an arm plate member 33 therebetween, as will be further described. Mounting plate member 23, as well as spaced-apart bracket members 25 and 27 are preferably constructed from a plate-like material such as, for example, cold-rolled flat plate steel having a thickness of about 0.125".

In construction of stabilizer 10, end portions 25' and 27' of bracket members 25 and 27, respectively, are preferably welded to opposite sides of mounting plate member 23 along widthwise end portions 25' and 27'. The approximate 0.125" thickness of mounting plate member 23 is selected so as to, upon attachment of bracket members 25 and 27 on opposite sides thereof as aforedescribed, provide a slot having a width not less than a thickness of arm plate member 33 as will also be now further described.

Alternatively, mounting bracket 20 may be fabricated to incorporate a "flared-out" portion that effectively incorporates therewithin, or replaces, either spaced-apart bracket member 25 or 27. In this manner, with a remaining spaced-apart bracket member 27 or 25, respectively, secured to bracket 20 as aforedescribed, the aforementioned slot is provided by virtue of a space existing between the flared-out portion of bracket 20 (replacing member 25 or 27) and between member 27 or 25, respectively.

Preferably, the slot width formed by such attachment, or alternative fabrication and attachment, is at least 0.125".

Pivotable arm assembly 30 includes arm plate member 33 and an elongated arm 35. Arm plate member 33 is preferably constructed from any suitable plate-like material such as again, for example, cold-rolled flat plate steel having a thickness of about 0.125". This thickness is chosen with regard to the thickness of mounting plate member 23 to ensure that arm plate member 33 is capable of being pivotally disposed within the aforementioned slot formed by the joining of members 23, 25, and 27 in construction of stabilizer 10.

Arm 35 is preferably constructed from cold-rolled steel rod stock having a diameter of 0.5", and a length of about 8.5". The 8.5" length of arm 35 is chosen to assist in providing an average acute angle of 32 degrees between the bicycle frame and the ground plane during a wheelie, as will be further described. Elongated arm 35 is rigidly joined to arm plate member 33 by again, for example, welding.

In further construction of stabilizer 10, arm plate member 33 is then inserted into the slot so formed by the joining of members 23, 25, and 27. Having been inserted into the slot, arm plate member 33 is then pivotally held in place in the slot by a pivot fastener 37 that extends successively through bracket member 25, arm plate member 33, and bracket member 27. Pivot fastener 37 may be, for example, a ⅜" inner diameter hardened steel threaded bolt with a locking nut. Pivot fastener 37 is then tightened in a conventional manner, such that arm plate member 33 is secured in the slot but may pivotally move about pivot fastener 37 somewhat freely.

A hinge means 40 is rigidly secured to a rearward or outboard end of arm 35 opposite arm plate member 33 and mounting bracket 20. Hinge means 40 may comprise, for example, a conventional ⅜" outer diameter hinge housing with a ¼" diameter hinge pin.

In turn, stabilizer wheel assembly 50 is hingably connected to hinge means 40 as provided thereby. Stabilizer wheel assembly 50 includes a stabilizer wheel frame 52 having opposing substantially parallel sides, and a stabilizer wheel 56 rotatably disposed between the sides of frame 52. Such rotatable disposition of stabilizer wheel 56 is accomplished by means of a conventional stabilizer wheel axle 54 passing successively through, and disposed within, one parallel side of frame 52, wheel 56, and the other side of frame 52. Preferably, stabilizer wheel 56 is a commercially available 2+⅜" diameter wheel similar to those used in in-line skates. As will be further described, hinge means 40 provides, in operation, articulation of stabilizer wheel assembly 50 behind pivotable arm assembly 30 in a left-to-right-to-left sense. In this manner, stabilizer wheel 56 is capable of maintaining rolling ground contact in operation rather than skidding, as will also be further described.

Further in construction of stabilizer 10, spring member 60 is rigidly joined at its opposite ends to, respectively, hinge attachment surfaces or edges 23' and 33' of mounting plate member 23 and arm plate member 33, respectively. Such attachment of opposite ends of spring member 60 to these edges 23' and 33' may be accomplished by, for example, welding.

Lastly in construction of stabilizer 10, an axle bolt hole 23h is drilled through a forward portion of mounting plate member 23 to accommodate a bicycle rear axle bolt. Preferably, axle bolt hole 23h has a diameter of about ⅜" to accommodate a typical or industry-standard bicycle axle bolt. Additionally, an oblong or oval hole having a width of about ⅜" and a length of about ¾" (not illustrated) is provided through mounting plate member 23 to accommodate a bicycle frame stop bolt assembly 29. As will be further described, the oblong or oval hole is provided for stop bolt assembly 29 to accommodate a variety of bicycle frames, as will be further described. Bicycle frame stop bolt assembly 29 includes a bolt, a lock washer, and a nut, all arranged in a conventional manner for disposition through, and secure fastening to, mounting plate member 23. When stabilizer 10 is attached to a bicycle for use thereupon, a portion of bicycle frame stop bolt assembly 29 is intended to rest against or forcibly abut the bicycle's frame, as will be further described.

Figure 4:
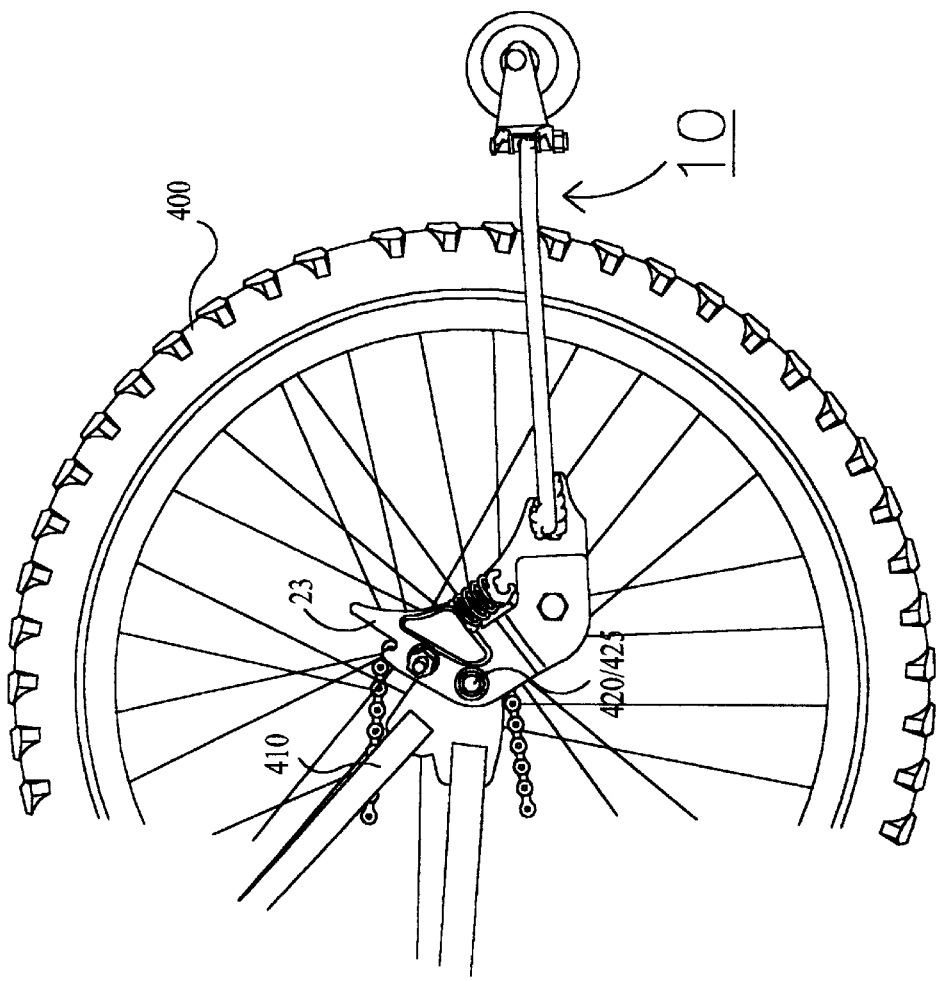
FIG. 4 is a front side illustration of a wheelie stabilizer and safety device of the present invention, attached to a bicycle and depicting an at-rest or not-in-use condition.
Figure 5:
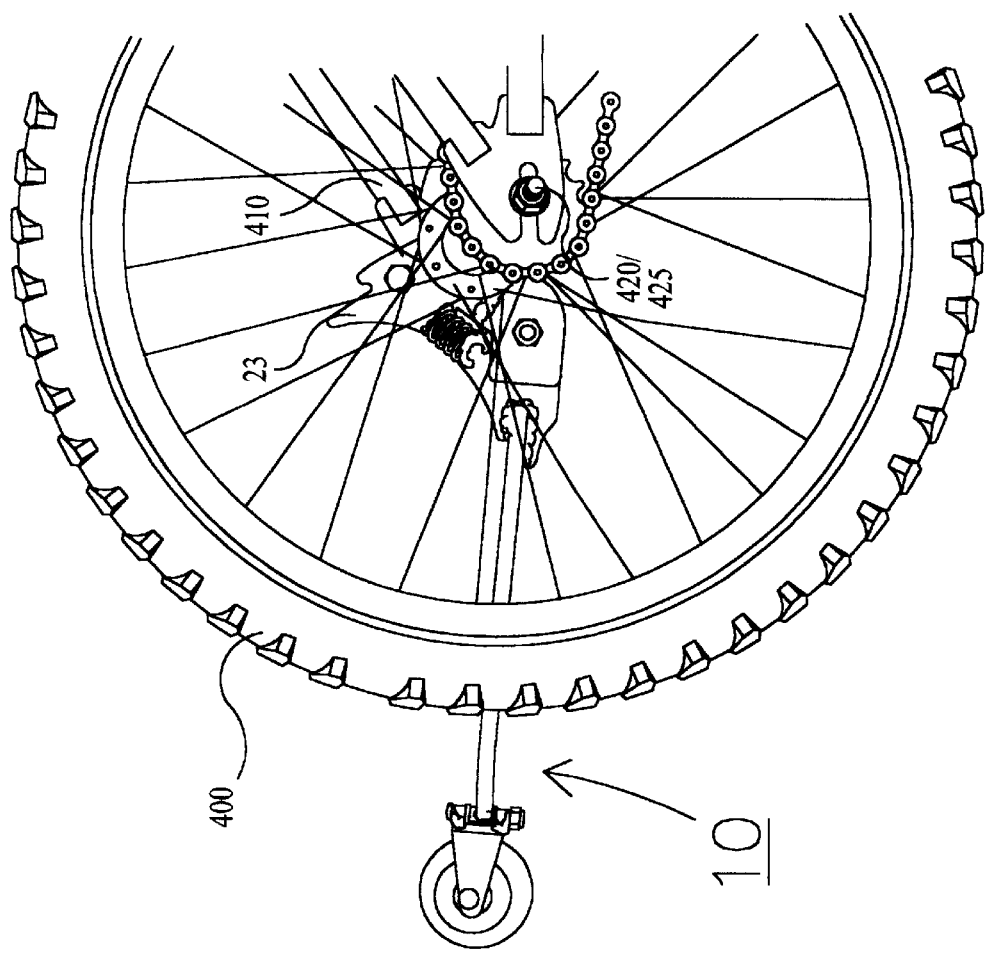
FIG. 5 is a back side illustration of a wheelie stabilizer and safety device of the present invention, attached to a bicycle and depicting an at-rest or not-in-use condition.
Figure 6:
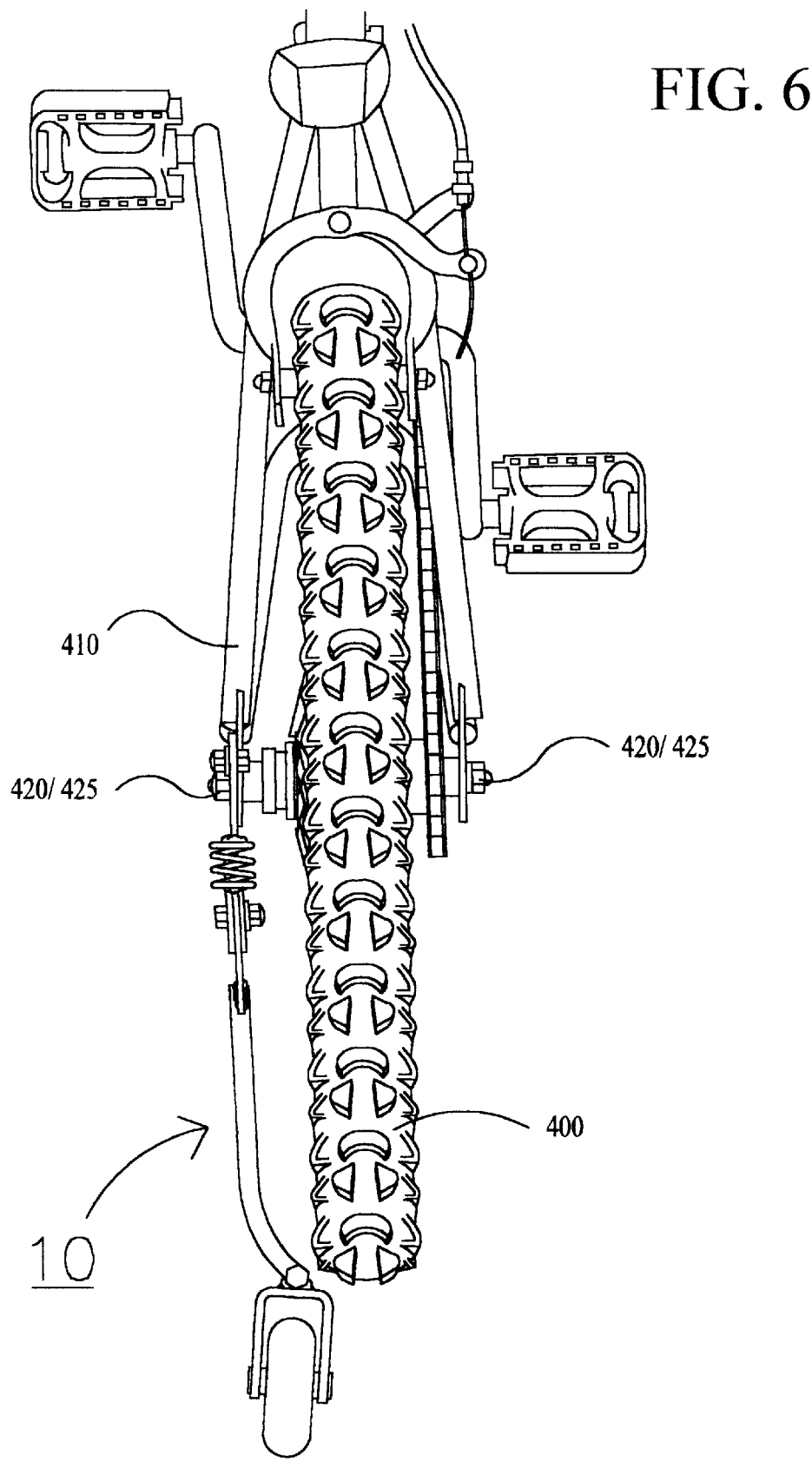
FIG. 6 is a rear view illustration of a wheelie stabilizer and safety device of the present invention, attached to a bicycle and depicting an at-rest or not-in-use condition.

Referring, now, to FIGS. 4, 5, and 6, in utilization of stabilizer 10 a user provides a bicycle that includes a rear wheel 400 attached to a bicycle frame 410 by means of a rear wheel axle assembly 420, all in a conventional manner. Rear wheel axle assembly 420 includes a terminating nut 425 threaded onto an axle bolt (not illustrated) of axle assembly 420. Before stabilizer 10 is attached to the bicycle, terminating nut 425 is removed by the user on a non-drive side thereof (opposite the bicycle's drive chain). Next, axle bolt hole 23h of mounting plate member 23 is engaged by the non-drive side of the axle bolt of axle assembly 420, with stabilizer 10 being positioned next to the non-drive side of bicycle frame 410. Such positioning is made with particular regard to both positioning of bicycle frame stop bolt assembly 29, and to a distance of stabilizer wheel 56 above the ground when the bicycle is at rest or in a non-wheelie position, as will be further described. Positioning of stabilizer 10 is made with further regard to whether bicycle frame stop bolt assembly 29 rests against or forcibly abuts the non-drive side of bicycle frame 410, as provided by the oblong or oval shape of the oblong or oval hole for bicycle frame stop bolt assembly 29 allowing such positioning. Additionally, stop bolt assembly 29 may be finely positioned and secured within the oblong or oval hole such that stop bolt assembly 29 selectively rests against or forcibly abuts frame 410, as will be further described.

With axle bolt hole 23h engaging the axle bolt and stabilizer 10 positioned as aforedescribed, terminating nut 425 is threaded back onto the axle bolt of axle assembly 420 and tightened against and onto mounting plate member 23 in completion of the attachment sequence of stabilizer 10 onto the bicycle.

Figure 7:
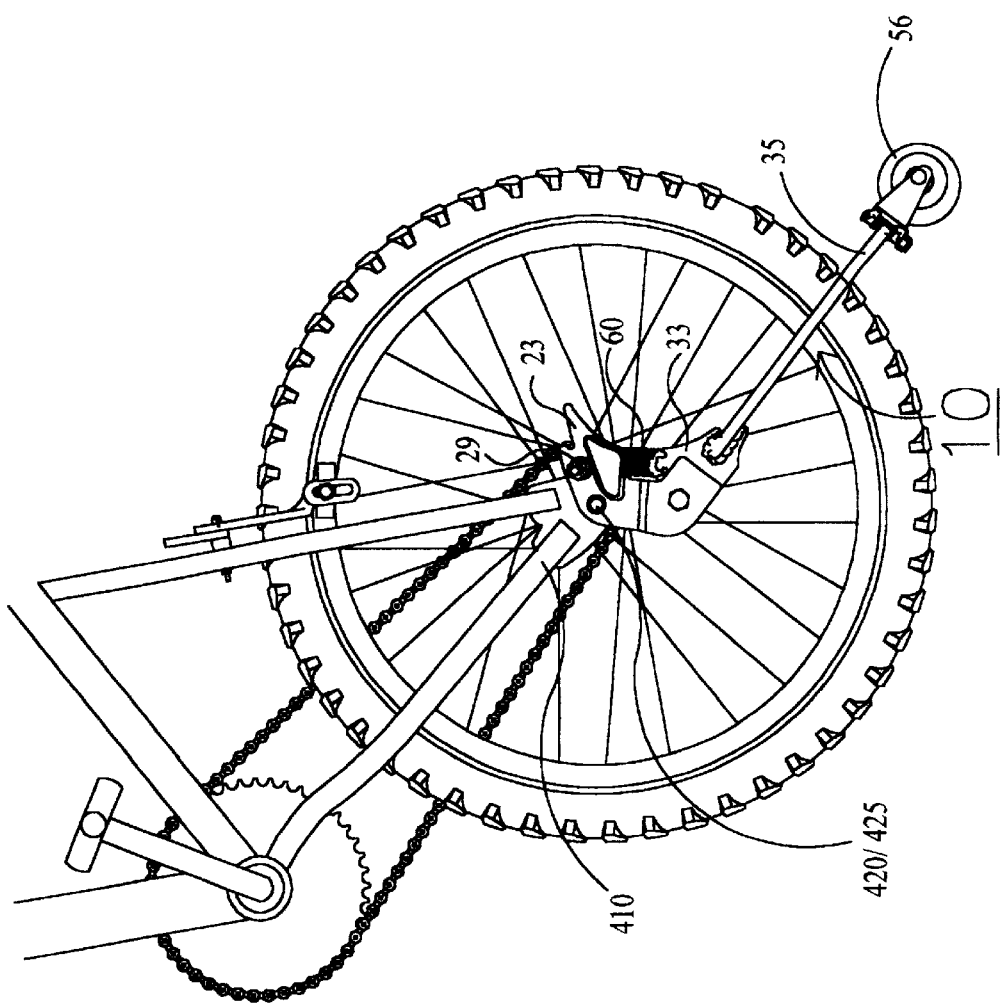
FIG. 7 is a front side illustration of a wheelie stabilizer and safety device of the present invention, attached to a bicycle and depicting an operative or in-use condition.

Referring, now, to FIG. 7, stabilizer 10 is shown in operation after being attached to a bicycle as aforedescribed. Therein, a bicycle is partially shown in a simulated wheelie position (without having been "powered up" into the wheelie by a rider), with the bicycle's front wheel (not shown) lifted off of ground contact such that bicycle frame 410 is at an acute angle relative to the ground.

As alluded to previously, the approximate 8.5" length of arm 35 is chosen to provide an average acute angle of 32 degrees between frame 410 and the ground during a wheelie. This average angle of 32 degrees results, during the wheelie, in a commonly desired average height displacement of the bike's front wheel above the ground. Also as alluded to above, frame stop bolt assembly 29 may be adjustably positioned within the oblong or oval hole. That is, just before mounting plate member 23 of stabilizer 10 is secured to or tightened against bicycle frame 410 at axle bolt hole 23h, and through adjustment of stop bolt assembly 29, stabilizer 10 may be finely positioned on the bicycle such that a bottom portion of stabilizer wheel 56 may be preferably about 7.25" above the ground when the bicycle is at rest or in a non-wheelie condition. This adjustment process assists in achieving the aforesaid average angle of 32 degrees between frame 410 and the ground during a wheelie.

As should be understood from the figure, the wheelie results in a pivoting of frame 410 about rear wheel axle assembly 420, to the acute angle above the ground. In such a position, stabilizer wheel 56 contacts the ground. With respect to the 8.5" length of arm 35, it should also be appreciated that this 8.5" length is selected so that, as a wheelie is popped, stabilizer wheel 56 contacts the ground just before the bike reaches the "top" of the wheelie. Arm plate member 33 then pivots against spring member 60, acting in combination as a cushion for the remaining motion distance to the top of the wheelie.

Thus, stabilizer wheel 56, upon making ground contact, acts to prevent over-rotation of frame 410 about axle assembly 420 due to the rigid attachment of stabilizer 10 to frame 410 through the aforedescribed connection of mounting plate member 23 to frame 410 via axle assembly 420 and terminating nut 425, and also through the aforedescribed abutment of bicycle frame stop bolt assembly 29 against frame 410. This prevention of over-rotation provides safety to a rider while performing the wheelie. Additionally, as the wheelie is performed for extended times, stabilizer wheel 56 also provides stability by virtue of compression and extension action of spring member 60 in a well-known spring action manner, in response to small rotational displacements or movements of frame 410 during the wheelie. Thus, a wheelie may be maintained by a rider by the operation of stabilizer 10 with much less effort than has been heretofore attainable.

Finally, it should be appreciated that hinge means 40 provides, during a wheelie, articulation of stabilizer wheel assembly 50 behind pivotable arm assembly 30 in a left-to-right-to-left sense. In this manner, stabilizer wheel 56 may shift back and forth, or articulate in the left-to-right-to-left sense as aforesaid, to prevent skidding and maintain rolling ground contact thereof as the rider shifts weight and/or changes the bicycle's direction during a wheelie.

Figure 8:
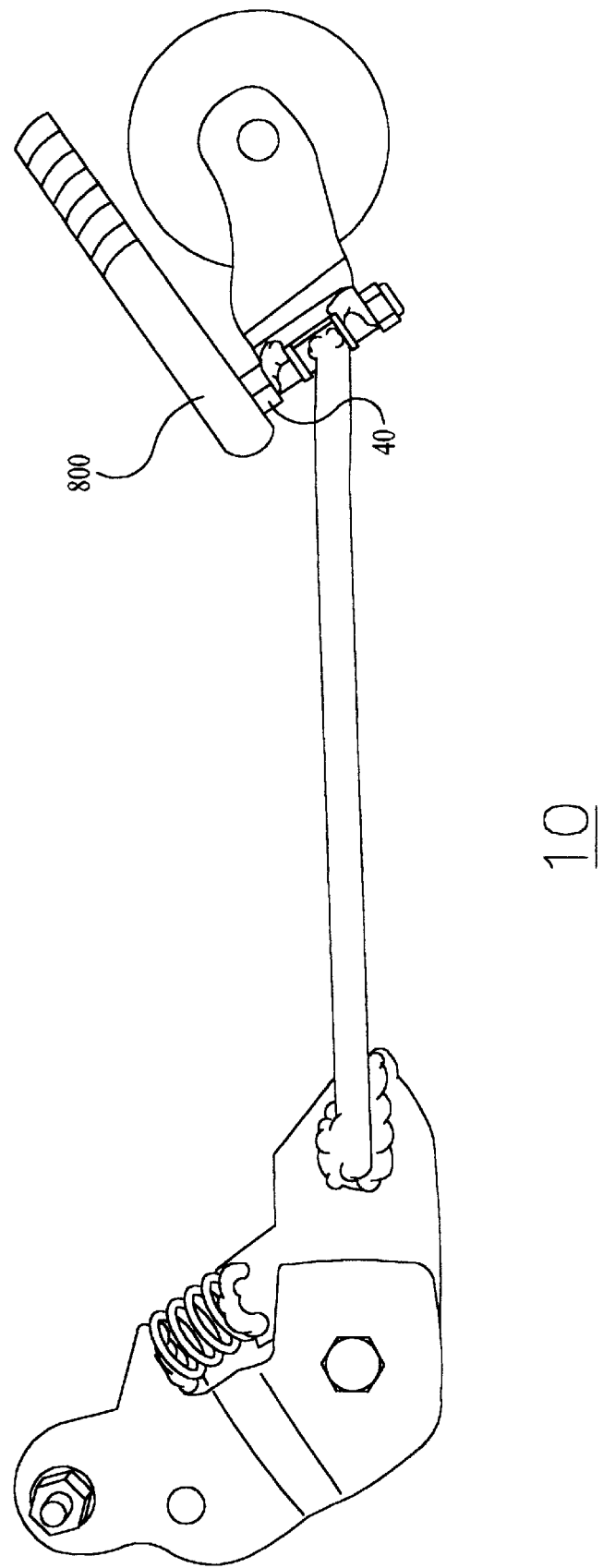
FIG. 8 is a front side illustration of a wheelie stabilizer and safety device of the present invention, further incorporating a foot rest peg.

In FIG. 8, an alternative embodiment of the wheelie stabilizer and safety device of the present invention is illustrated. Therein, stabilizer 10 includes a foot rest peg 800 secured to hinge means 40. Specifically, peg 800 is fabricated from, preferably, hardened chrome-plated steel stock into a generally hemispherical right cylinder, having a diameter of about 1.5" and a length of about 4.5". A portion of peg 800 may, as illustrated, be secured to hinge means 40 by, for example, welding the corresponding portion of peg 800 to hinge means 40. With peg 800 thus provided as an accessory to stabilizer 10, a rider may while popping a wheelie rest a foot on peg 800. Further, the rider may forcibly articulate hinge means 40 by exerting force with the foot upon peg 800. Such forced articulation may provide for greater directional control of the bike during the wheelie.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired similar results. For instance, a leaf spring could be substituted for the helical spring of spring member 60. Also, stabilizer 10 could be attached to, conversely, a portion of a bicycle's front wheel axle. Further, a plate member could be substituted for elongated arm member 35. Additionally, the aforementioned joining of certain components together through welding could be accomplished by, alternatively, selected fastening means such as riveting and the like.

It should be understood that any such suitable modification to, or alternative embodiment of, the invention is intended to be made such that stabilization, and enhancement of the safety of, the performance of a wheelie is achieved.

Lastly, the choice, of course, of mechanical sizes and strengths of various components are all a matter of design choice depending upon an intended implementation or use of the present invention and attachment to a specific bicycle.

Accordingly, these and other various changes or modifications in form and detail of the present invention may also be made therein, again without departing from the true spirit and scope of the invention as defined by the appended claims.

What is claimed is:

1. A bicycle attachment for providing stability and safety to a rider during performance of a wheelie by the rider on the bicycle, the bicycle attachment comprising:
   an arm assembly having an arm plate member at one end thereof;
   a mounting bracket, including,
      a mounting plate member adapted to be securely coupled to an axle portion of a bicycle frame, and
      first and second spaced-apart bracket plate members for forming a slot for receiving said arm plate member, where an end portion of each of said first and second spaced-apart bracket plate members is rigidly coupled to said mounting plate member;
   means for pivotally coupling said arm plate member within said slot;
   a spring member secured, at one end thereof, to said mounting plate member and secured, at an opposite end, to said arm assembly near said arm plate member; and
   a stabilizer wheel assembly including,
      a wheel frame hingably mounted to an end of said arm assembly opposite said arm plate member, and
      a freely rotating wheel coupled to said wheel frame.

2. The bicycle attachment of claim 1, further including means for securely coupling said mounting plate member to said axle portion of said bicycle frame.

3. The invention as claimed in claim 1, wherein said spring member is a helical spring.

4. The invention as claimed in claim 1, wherein said spring member is a leaf spring.

5. A bicycle attachment for providing stability and safety to a rider during performance of a wheelie by the rider on the bicycle, the bicycle attachment comprising:
   an arm assembly having an arm plate member at one end thereof;
   a mounting bracket, including,
      a mounting plate member adapted to be securely coupled to an axle portion of a bicycle frame, and
      first and second spaced-apart bracket plate members for forming a slot for receiving said arm plate member, where an end portion of each of said first and second spaced-apart bracket plate members is rigidly coupled to said mounting plate member;
   means for pivotally coupling said arm plate member within said slot;
   a spring member secured, at one end thereof, to said mounting plate member and secured, at an opposite end, to said arm assembly near said arm plate member;
   a stabilizer wheel assembly including,
      a wheel frame hingably mounted to an end of said arm assembly opposite said arm plate member, and
      a freely rotating wheel coupled to said wheel frame; and
   a foot rest peg secured to said stabilizer wheel assembly at said wheel frame.

* * * * *